United States Patent
Bernot et al.

[11] Patent Number: 5,954,850
[45] Date of Patent: Sep. 21, 1999

[54] METHOD FOR MAKING GLASS PRESSURE CAPACITANCE TRANSDUCERS IN BATCH

[76] Inventors: Anthony J. Bernot, 16935 E. Campbell; Raymond H. Niska, 15836 E. Chapala St., both of Gilbert, Ariz. 85234; Nicholas F. Schmidt, 3906 E. Sunnyside Dr., Phoenix, Ariz. 85028

[21] Appl. No.: 08/956,174

[22] Filed: Oct. 22, 1997

Related U.S. Application Data

[60] Provisional application No. 60/032,017, Nov. 22, 1996.

[51] Int. Cl.$^6$ .................................................. C03C 17/00
[52] U.S. Cl. .................................. 65/60.1; 65/30.1; 65/31; 65/36; 65/42; 65/43; 65/58; 65/59.5; 65/59.21; 65/60.8; 65/60.4; 65/138; 65/155; 29/25.41; 29/25.42; 29/595; 29/621.1
[58] Field of Search ................................ 65/30.1, 31, 36, 65/42, 43, 58, 59.5, 59.21, 60.1, 60.8, 60.4, 138, 155; 29/25.41, 25.42, 594, 621.1, 595; 361/283.1, 283.4; 73/724

[56] References Cited

U.S. PATENT DOCUMENTS

| | | |
|---|---|---|
| 3,232,114 | 2/1966 | Ferran . |
| 3,697,835 | 10/1972 | Satori . |
| 3,962,921 | 6/1976 | Lips . |
| 3,965,746 | 6/1976 | Rabek . |
| 4,422,335 | 12/1983 | Ohnesorge et al. . |
| 4,609,966 | 9/1986 | Kuisma . |
| 4,689,999 | 9/1987 | Shkedi . |
| 4,876,892 | 10/1989 | Arabia et al. . |
| 4,926,696 | 5/1990 | Haritonidis et al. . |
| 5,189,591 | 2/1993 | Bernot . |
| 5,317,919 | 6/1994 | Awtrey . |
| 5,440,931 | 8/1995 | Wiegand et al. . |
| 5,544,399 | 8/1996 | Bishop et al. . |

OTHER PUBLICATIONS

"A Glass–Based Capacitive Transducer", Apr. 1996, Sensors.

*Primary Examiner*—Peter Chin
*Assistant Examiner*—Michael P. Colaianni
*Attorney, Agent, or Firm*—John R Rafter

[57] ABSTRACT

The present provides a method for making glass pressure sensors in batch. First glass plates of appropriate dimensions are scribed. Then electrodes are sputters onto each of the plates, followed by screen printing a frit layer and crossover tabs. The plates are then preglazed and bonded together to form a plurality of sensors. The plates are then scribed and broken along the scribes to form individual sensors.

10 Claims, 4 Drawing Sheets

1

METHOD FOR MAKING GLASS PRESSURE CAPACITANCE TRANSDUCERS IN BATCH

REFERENCE TO COPENDING APPLICATION

This application claims the benefit of U.S. Provisional Application No.: 60/032,017 filed Nov. 22, 1996.

TECHNICAL FIELD

This invention relates generally to pressure transducers and in particular to a process for making glass pressure capacitance transducers in batch.

BACKGROUND OF THE INVENTION

Bernot, U.S. Pat. No. 5,189,591 which is assigned to the assignee of this case describes an aluminosilicate glass pressure sensor and method for making such a sensor one at a time. Clearly, cost reductions in making such sensors could be achieved if they could be made in batch. Awtrey, U.S. Pat. No. 5,317,919 describes one method for making glass sensors in batch. In this method the conductive coatings are defined by photolithographic and etch techniques.

However, there is still a need for a new and improved method of making such glass sensors in batch.

SUMMARY OF THE INVENTION

An object of the present invention is to provide a method for making glass sensors in batch.

The present invention achieves this object with a method that includes the following steps. Scribing glass plates. Sputtering an electrode pattern onto the plates followed by screen printing glass frit and crossover tabs thereon. The plates are preglazed and bonded together to form a plurality of sensors. The plates are then broken along the scribe to form individual sensors.

These and other objects, features and advantages of the present invention are specifically set forth in or will become apparent from the following detailed description of a preferred embodiment of the invention when read in conjunction with the accompanying drawings.

DESCRIPTION OF THE INVENTION

Bernot, U.S. Pat. No. 5,189,591 which issued on Feb. 23, 1993 and is assigned to AlliedSignal Inc. is hereby incorporated by reference. This patent discloses a capacitive pressure transducer made of aluminosilicate glass.

Figure 1:
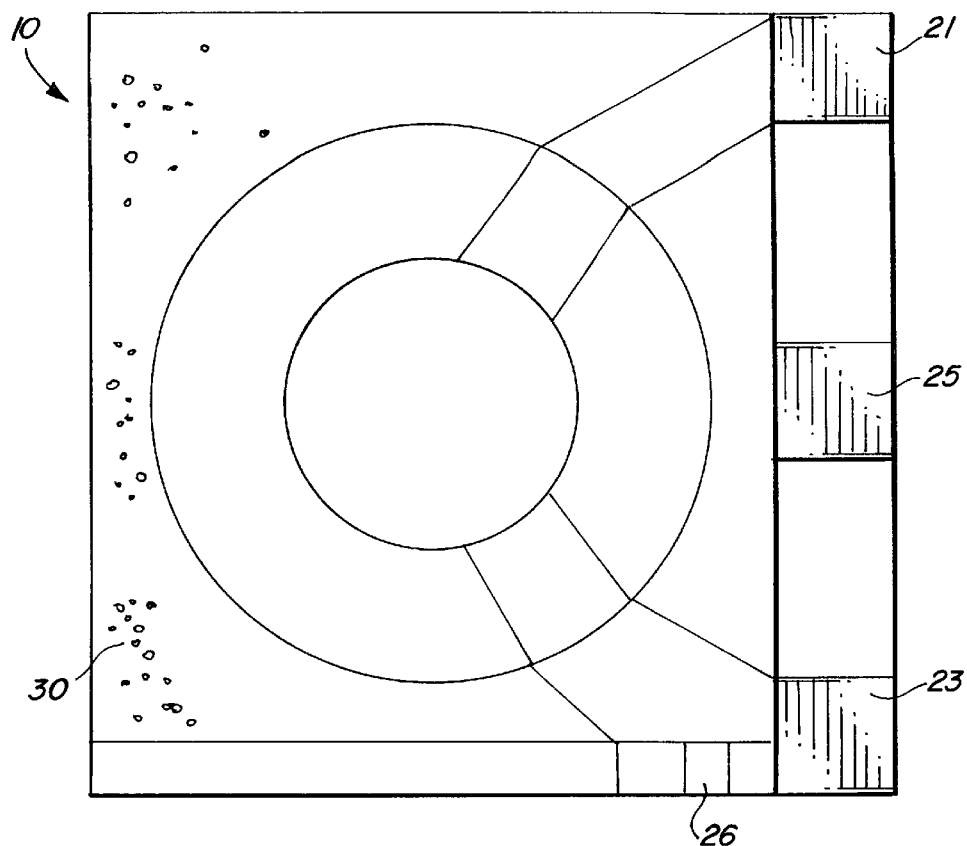
FIG. 1 is a top view of a glass pressure transducer made by the batch process contemplated by the present invention.
Figure 2:
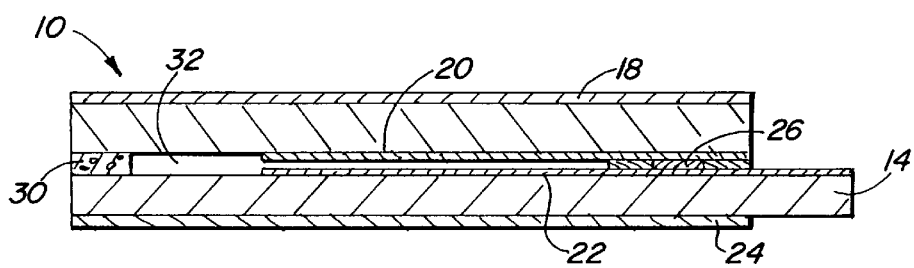
FIG. 2 is a side view of the pressure transducer of FIG. 1.

A glass pressure transducer 10 contemplated by the present invention is shown in FIGS. 1 and 2 The transducer or sensor 10 includes a top diaphragm 12 and a bottom diaphragm 14 made from a glass preferably aluminosilicate glass such Corning #1723 or #1737F. Ground shields 18 and 24 are deposited on the outer surfaces of the diaphragms 12 and 14. Electrodes 20 and 22 are deposited in the inner surfaces of the diaphragms 12 and 14. A crossover metal tab 26 preferably made of silver acts as a conductor from the electrode 20 to a top electrode lead 21. Alternatively, the crossover tab 26 can be made from other metals such as palladium, or gold. The electrode 22 is connected to a bottom electrode lead 23. A ground lead 25 may also be added. The leads 21, 23, and 25 are preferably made of platinum. Wires, not shown, are coupled to these leads. The geometry of the electrodes 20, and 22 can be round or square in addition they can also have a reference capacitor. The ground shields 18, 24 and the electrodes 20, 22 are made of a noble metal preferably platinum.

The diaphragms 12 and 14 are bonded together such that the electrodes 20 and 22 form a capacitor. The bond is formed by hydrate bonding or glass friting. The frit glass 30 acts as a spacer between the diaphragms 12 and 14 and also as a seal to form a cavity 32 between the diaphragms. The cavity 32 can be evacuated to form either a vacuum or some other reference pressure.

Figure 3:
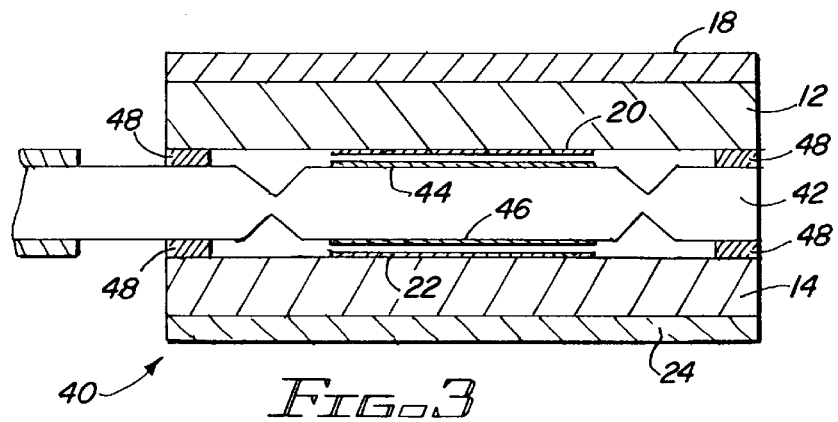
FIG. 3 is a side view of a glass accelerometer made by the batch process contemplated by the present invention.

Referring to FIG. 3, a three piece glass accelerometer 40 can be formed from the pressure transducer 10 by mounting a glass, preferably aluminum silicate, seismic mass 42 between the top and bottom diaphragms 12,14. The seismic mass 42 has an electrode 44 in opposed relationship with electrode 20 and an electrode 46 in opposed relationship with electrode 22. The seismic mass 42 is bonded to the diaphragms 12,14 by frit 48 in such a way as to form cavity 49.

Figure 4:
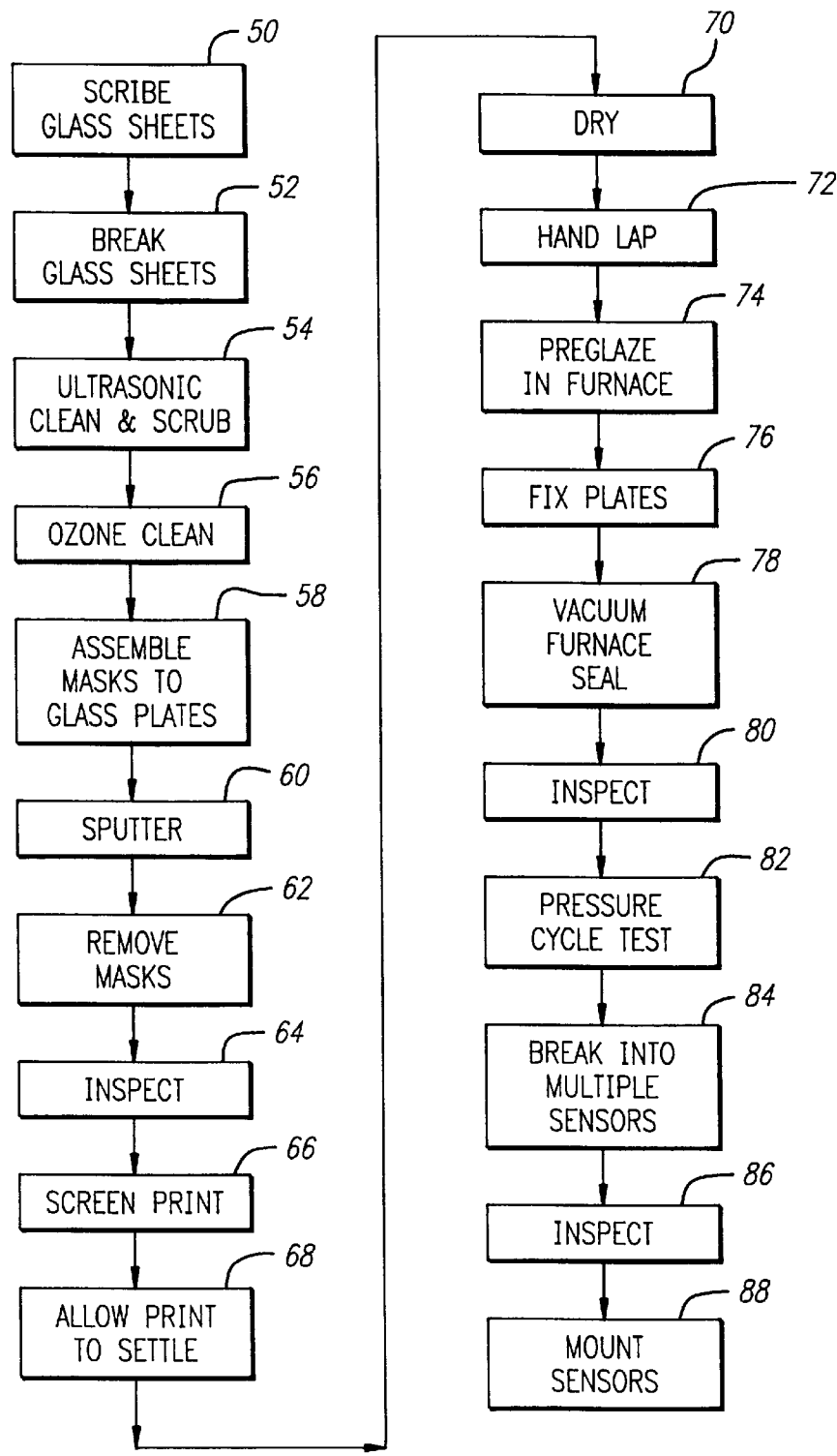
FIG. 4 is a flow chart of the batch process contemplated by the present invention.
Figure 5A:
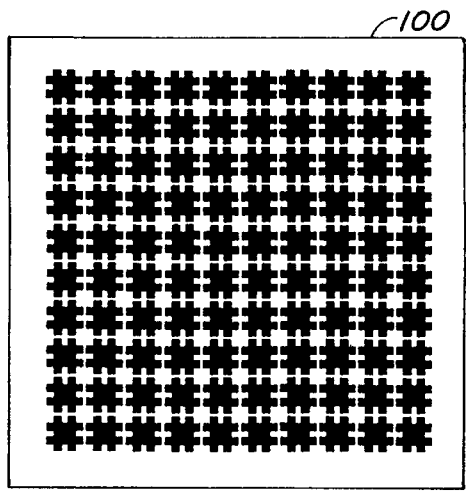
FIG. 5 shows the components used to make a pressure sensor of FIG. 1 using the process contemplated by the present invention.
Figure 5B:
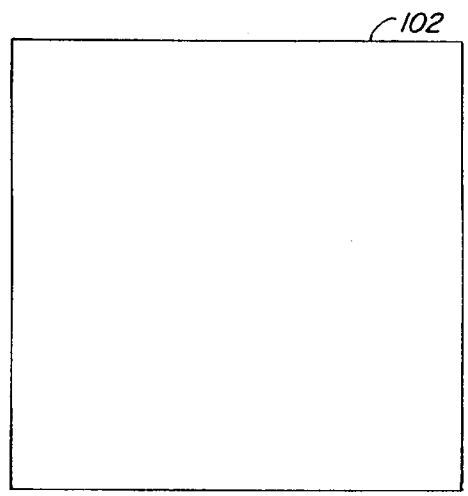
Figure 5C:
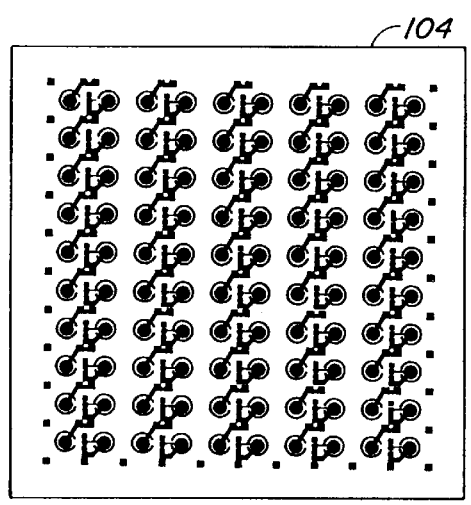
Figure 5D:
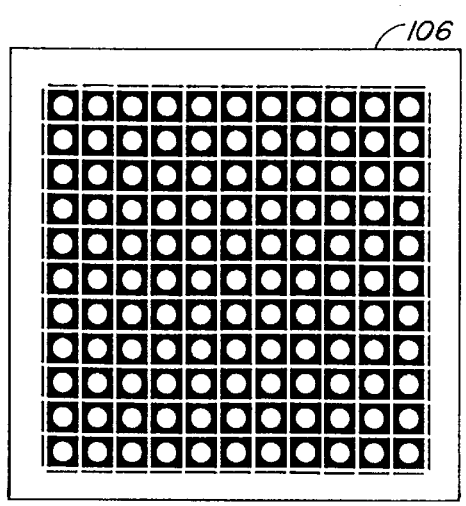
Figure 5E:
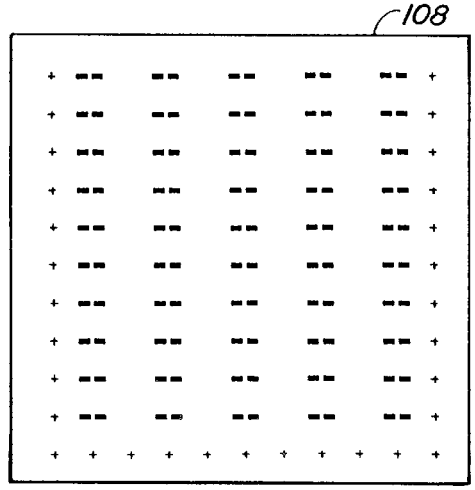
Figure 5F:
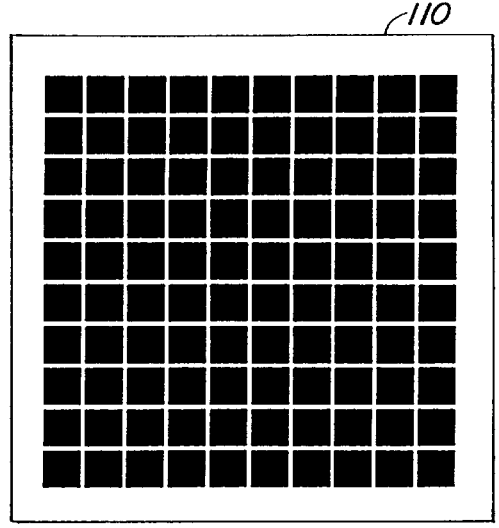
Figure 5G:
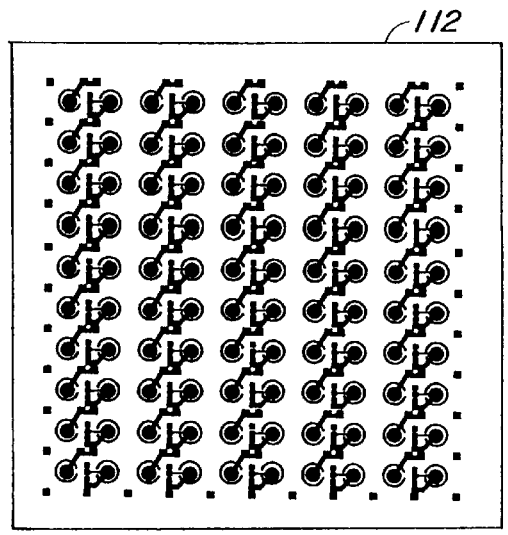
Figure 5H:
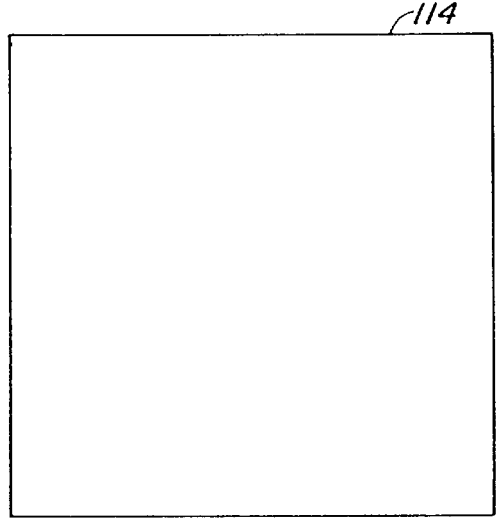
Figure 5I:
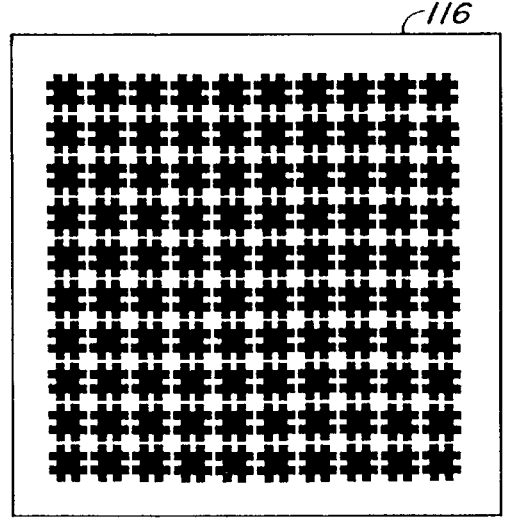

With reference to FIGS. 4 and 5, the glass pressure transducer 10, or accelerometer 40 and other transducers and accelerometers similar thereto can cost effectively be made in batch as follows. The process starts with a sheet of uncoated glass such as aluminosilicate glass Corning 1737F. The thickness of the glass is selected based on the sensor pressure range. For example, a thickness of 0.5 mm would be for a 20 psi sensor. The glass sheet is scribed in step 50 and cut or broken in step 52 into 6×6 inch square plates, or preferably 5¾×5¾ inch plates. If desired, the spacing cavity shown in the '591 patent can be etched into the glass. Each plate is then subjected to a cleaning process, including but not limited to washing in a spin-rinser-dryer and ozone cleaning for about sixty minutes, steps 54 and 56.

To form diaphragms 12, the aperture mask 100 is fixed to the top of glass plate 102 and the aperture mask 104 is fixed to the bottom of plate 102. Depending on the type of sputtering machine used, each side of the plates 102, 114 may either sputtered separately or both can be sputtered at the same time. If sputtered separately, the plate is ozone cleaned between sputterings. For diaphragms 14, the aperture mask 116 is fixed to the bottom of glass plate 114 and the aperture mask 112 to the top of plate 114. The plates 102, 114 with its respective masks are inserted into a conventional sputtering machine step 60 where it is pre-etched for 5–10 minutes. The pattern in mask 100 is sputtered onto the plate 102 forming ground shields 18 and the pattern on mask 104 forms electrodes 20. Likewise, the pattern in mask 116 is sputtered onto the bottom of plate 114 to form ground shields 24 and the mask 112 electrodes 22. The preferred sputter gas is argon. The patterns are deposited to a thickness of 750–1000 angstroms with 1000 angstroms preferred. The depositions are done with a partial pressure of oxygen. Alternative methods and materials may be used in deposition, such as electron-beam, ion-beam, or organo-metallics. Optionally, for increased yield a silicon dioxide insulator 110 can be sputtered onto the electrodes 22 to a thickness of 1000 angstroms.

After an inspection step 64, the next step 66 is to apply the glass frit screen over the bottom surface of the plate 102. The glass frit 106 is chosen to match the glass. For Corning 1737 one can use the glass frit Corning 7574 or Semcom SCB1. The glass frit 106 is applied by a conventional screen printer and has a preferable mesh of 325 or greater. Though the mesh may vary depending on the pressure range of the sensor. Other possible meshes are 200 or 250. The crossover metal tabs 108 are also screen printed onto the top surface of plate 114 with a mesh the same as the glass frit.

After screening it is important to allow the screen printed frit, (not the cross-over tab), to settle so that bumps and small voids will spread and smooth out. This step 68 is accomplished by letting the flit settle for about 30 minutes before drying the frit at a 150 degrees C., step 70. The fritted plate is then transferred to a flat optical quartz plate and slightly hand lapped, step 72, with a 5 micron grind finish for a few seconds to remove high spots on the dried frit and then wiped clean with a lintless wipe. The plate 114 with the silver cross over tabs is also wiped clean. Both plates 102, 114 are then preglazed, step 74, in an oven or furnace. A typical preglaze profile is as follows: heat from 25 deg. C., (room temperature) to 570 deg. C. over about one hour; hold at a constant 570 deg. C. for about 45 minutes; heat to 640 deg. C. over about 30 minutes; hold at a constant 640 deg. C. for about 30 minutes, shut off heaters in oven and let cool down.

Optionally, again remove high spots on the frit by hand lapping over a ground, optical flat surface for a few seconds.

Using a fixture with inconel clips at a pressure of about 3 psi per clip, in step 76 the plate 114 is fixed to the plate 102 with the frit facing the silver tabs. Once properly aligned, the fixture is transferred to a vacuum furnace. In step 78, the furnace is evacuated to form a vacuum. (pressure less than 100 millitorr). The plates are then sealed together by heating from room temperature to about 600 deg. C. over a period of 60 plus or minus 10 minutes. Hold at 600 deg. C. for about 15 plus or minus 1 minute. Heat to about 680 deg. C. over 15 plus or minus 1 minutes. Hold at 680 deg. C. for about 45 plus or minus 1 minutes. Shut off heaters and let cool. At 400 deg. C. or less open the furnace to the atmosphere. All temperatures cited in the process may vary by plus or minus 50 degrees C.

Remove the fixture, and inspect frit sealing 80. Optionally, run a pressure cycle test 82. Place the fixture in a pressure chamber and cycle to above the sensors operating pressure, thus removing pressure hysteresis.

In step 84, the bonded plates are scribed and transferred to a break table and are broken along the scribes to form multiple sensors. After a visual inspection 86, the sensors are then mounted on a pressure housing base, step 88.

Various modifications and alterations to the above described preferred embodiment will be apparent to those skilled in the art. Accordingly, this description of the invention should be considered exemplary and not as limiting the scope and spirit of the invention as set forth in the following claims.

What is claimed is:

1. A method for making glass pressure capacitance transducers in batch, comprising the steps of:
   (a) scribing first and second plates of uncoated glass;
   (b) cleaning said first and second plates;
   (c) fixing to a first side of said first plate a first aperture mask having an electrode pattern;
   (d) fixing to a first side of said second plate a second aperture mask having said electrode pattern;
   (e) sputtering said electrode pattern onto said first sides of said first and second plates;
   (f) removing said first and second aperture masks;
   (g) screen printing glass frit on to said first side of said first plate;
   (h) screen printing crossover tabs on an edge of said first side of said second plate;
   (i) preglazing said first and second plates;
   (j) fixing said first and second plates together so said respective first sides contact;
   (k) sealing and bonding said first and second plates together to form a plurality of sensors wherein said cross-over tabs form an electrically conductive path between said electrode patterns on said first and second plates; and
   (l) scribing and breaking said bonded plates along said scribes to form multiple sensors.

2. The method of claim 1 further comprising the steps of:
   fixing to a second side of said first plate a third aperture mask having a ground shield pattern;
   fixing to a second side of said second plate a fourth aperture mask having said ground shield pattern;
   sputtering said ground shield pattern onto said second sides of said first and second plates; and
   removing said third and fourth aperture masks.

3. The method of claim 2 wherein said sputtering of said electrode pattern and said ground shield pattern include a pre-sputtering etching step.

4. The method of claim 1 wherein said cleaning step includes ultrasonic cleaning, scrubbing and ozone cleaning.

5. The method of claim 1 further including after step (g) the step of letting said glass frit settle.

6. The method of claim 5 further including after said settling the steps of drying and hand lapping said glass frit.

7. The method of claim 1 further including after step (f) the step of sputtering onto one of said first sides a silicon dioxide insulator.

8. The method of claim 8 further including after step (l) the step of mounting an individual sensor on a housing base.

9. The method of claim 1 wherein step (k) includes the step of heating said plates in a vacuum.

10. The method of claim 1 further including after step (k) the step of running said plurality of sensors through a pressure cycle test.

* * * * *